(No Model.) 2 Sheets—Sheet 1.

G. A. FORD.
STORAGE BATTERY.

No. 534,603. Patented Feb. 19, 1895.

WITNESSES.
R. B. Moser.
G. S. Scharffer

INVENTOR.
George A. Ford.

By H. S. Fisher ATTORNEY.

(No Model.)  G. A. FORD.  2 Sheets—Sheet 2.
STORAGE BATTERY.

No. 534,603.  Patented Feb. 19, 1895.

ATTEST
Richard D. Moser
G. L. Schaeffer

INVENTOR
George A. Ford
By H. J. Fisher, ATTORNEY

UNITED STATES PATENT OFFICE.

GEORGE A. FORD, OF CLEVELAND, OHIO.

STORAGE-BATTERY.

SPECIFICATION forming part of Letters Patent No. 534,603, dated February 19, 1895.

Application filed August 11, 1894. Serial No. 520,008. (No model.)

*To all whom it may concern:*

Be it known that I, GEORGE A. FORD, a citizen of the United States, residing at Cleveland, in the county of Cuyahoga and State of Ohio, have invented certain new and useful Improvements in Storage-Batteries; and I do hereby declare that the following is a full, clear, and exact description of the invention, which will enable others skilled in the art to which it appertains to make and use the same.

My invention relates to storage batteries, and the invention consists in a battery constructed substantially as shown and described and particularly pointed out in the claims.

Figure 1:
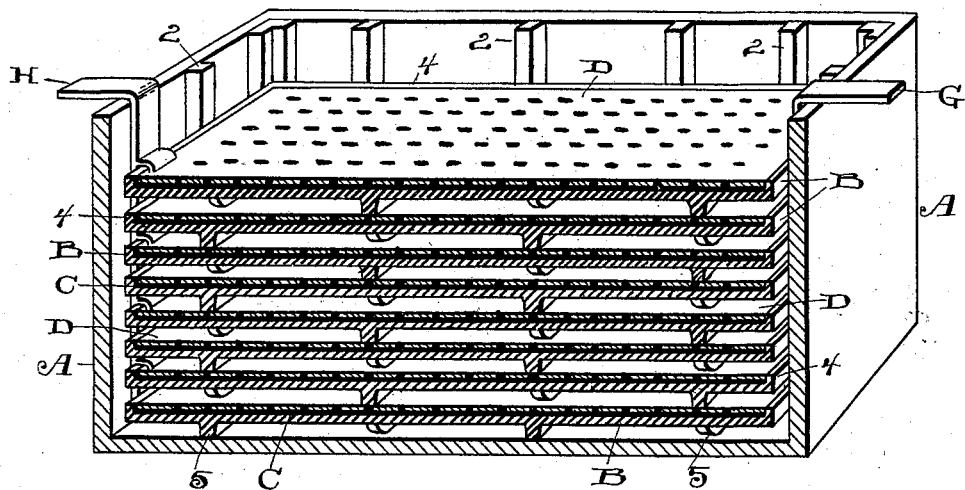
Figure 4:
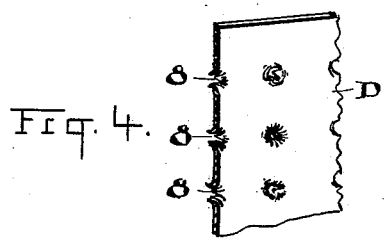
Figure 2:
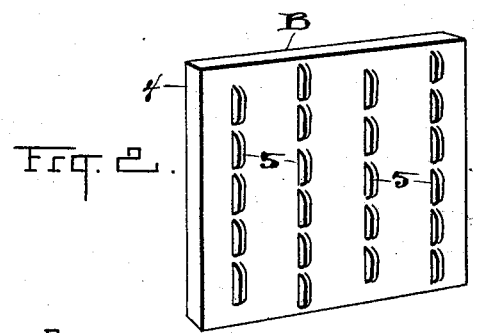
Figure 3:
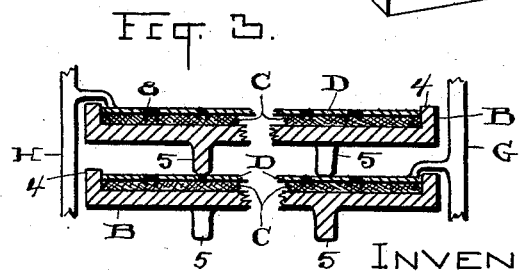
Figure 5:
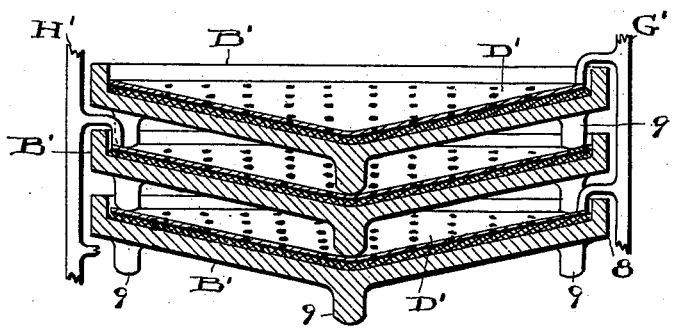
Figure 6:
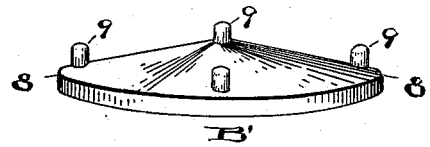
Figure 7:

In the accompanying drawings, Figure 1 is a perspective view of a cell made up according to my invention, the said cell being sectioned on its near side so as to disclose the internal construction thereof. Fig. 2 is a perspective view of one of the porous pans showing the bottom thereof. Fig. 3 is a vertical section of a couple of pans and showing the connections at the side thereof for carrying the current. Fig. 4 is a perspective view of a section of one of the conducting plates which are laid over the active material in the pans and showing said plate as perforated substantially as hereinafter described. Fig. 5 is a vertical central sectional elevation of a series of three porous pans and their conductors and connections as they appear in operation. Fig. 6 is a bottom perspective of a porous pan constructed according to my modification, and Fig. 7 is a perspective view of a perforated conducting plate to match said pan.

In Fig. 1, A represents the jar of the battery which may be of any suitable material, and, indeed, of any preferred form or style, but a rectangular jar or receptacle is preferred on account of the greater economy of space which that form affords. The said jar is provided with a series of vertical ribs —2— on its inside and upon all sides thereof, and these ribs serve to engage the edges of the porous pans B and keep said pans in their proper place and relation to one another and at the same time afford a free exposure of the pans about their edges to the battery liquid.

The pans B are shown here as being perfectly flat and rectangular in outline and as having very light or shallow flanges or rims —4— about their edges on top and projections or ribs —5— upon their bottom. The porous pans B are made of earthenware, the same as the usual porous pots, and they have rims or flanges of just sufficient depth to accommodate the active material C and the conducting plate D over said material. These flanges may be of a little greater depth than that, but should not be much greater, and are only really needed to confine the active material and the conducting plate over the same.

In making up the battery, I apply the active material, which may be of any suitable kind usually employed in storage batteries, immediately upon or over the top surface of the porous pan and distribute the same as uniformly as possible thereon. The depth of this material should of course only be such as will enable the entire spread of material to be perfectly formed and utilized for storage purposes, and anyone skilled in the art of storage battery construction will know in about what quantity and depth the active material should be applied.

Having thus spread and evened the active material upon the porous pan, I place over said material a conducting sheet or plate D. This plate is designed to serve the purpose simply of a conductor and has no other function or use in the battery. The active material is supported entirely by the porous pan B, and I may use this particular style or plate, or any other conducting medium which will answer the purpose. The plate $\mathrm{D}$ is designed to be perforated at frequent intervals over its entire surface, and I show here a plate in which the perforations are formed by displacing the metal of the perforation and throwing it onto the side of the plate where it forms projections —8— very much as would be formed by thrusting a punch through a sheet of tin. These projections or teeth of course penetrate the active material and serve to improve the connections for the purposes of conductivity as well as give a better effect to the plate itself by reason of the circulation of the battery liquid through said perforations. Having thus filled the pan and placed it in the battery, cell or jar, another pan is filled in like manner as the first and set into the jar upon the first one. The ribs or projections —5— on the bottom of the second pan rest upon the plate D of the first and hold it down upon the active material, and the battery is made up in this way by placing the pans one upon the other, as clearly seen in Fig. 1, until the jar is filled to the required depth therewith. The alternate cells are coupled up on one side by the conducting strip or strap G and on the opposite side by a like conducting strip or strap H, and one of these is negative and the other positive, and the coupling up of the cells is effected just as in other batteries. The battery liquid circulates between the pans and all about them, so that every portion of every pan is exposed to the liquid, while at the same time they are all separate from one another so far as any conducting connections are concerned. It will be seen that it is impossible with this construction of battery to spill out any of the active material and there are no plates to buckle or to be otherwise injuriously affected by the battery. If the active material requires room for expansion it has all the room it needs and at the same time it is so placed that it is exposed to the liquid at all points and has every opportunity to form and to act to the best possible advantage. Neither is there any possibility of the active material losing or dropping out of any of the pans so as to endanger the cell by short circuiting at any point. Nothing short of a total destruction of the pan can liberate the active material therein to do dangerous work to the cell.

It will of course be understood that in so far as the form of the cell here shown is concerned, especially in respect to the projections on its bottom and in other respects, there is considerable latitude for change without departing from the spirit of the invention.

In Figs. 5 to 7, inclusive, I show a construction which overcome possible objection on account of the gases accumulating under the pans and impeding the action of the battery. In this construction I employ a porous pan or saucer B' which is deepest at its center and has its bottom inclined from its edge —8— to said deepest point. Then by spacing the pans or saucers from each other a suitable distance the gases have a free clearance. It will be noticed that the pans B' have projections —9— on their bottoms which rest on the conducting plate D' of the pan next beneath, and conductors H' and G' respectively are coupled with said plates alternately. The active material is in all cases spread on the porous pan in such depth as may be found best, and the plates D' are then placed thereon and held in contact with said material by the battery elements above.

Having thus described my invention, what I claim as new, and desire to secure by Letters Patent, is—

1. In storage batteries, a porous pan having its bottom deepest at its center and inclined from said deepest point to the edge of the pan and projections on the bottom of the pan, substantially as set forth.

2. A storage battery, consisting of a series of two or more porous pans arranged one over the other, said pans having projections on their bottom, active material applied to said pans and perforated conducting plates resting on said material and connections for said plates, substantially as set forth.

3. In storage batteries, a battery consisting of a series of porous pans having their bottoms inclined from the edge of the pan to the center of the bottom, active material spread upon said pans and an open work conductor laid upon the active material in each pan and connected with an upright conductor, substantially as set forth.

4. A storage battery cell consisting of a series of porous non-conducting pans, active material applied to the inner surface of said pans, an open work conductor spread upon the active material in each pan, and means between the bottom of each pan and the conductor next beneath to support said pan on said conductor, whereby the weight of the pile is brought onto the conductors, and the said pans and conductors constructed over their opposed surfaces to afford a free circulation between said parts and the outside thereof, thereby affording a free escape of gas, substantially as set forth.

Witness my hand to the foregoing specification.

GEORGE A. FORD.

Witnesses:
 H. T. FISHER,
 M. G. NORTON.